US011351848B2

(12) United States Patent
Matsumoto

(10) Patent No.: US 11,351,848 B2
(45) Date of Patent: Jun. 7, 2022

(54) SEALING STRUCTURE FOR TRUCK CARGO BED WITH SHUTTER

(71) Applicant: NISHIKAWA RUBBER CO., LTD., Hiroshima (JP)

(72) Inventor: Atsuo Matsumoto, Hiroshima (JP)

(73) Assignee: NISHIKAWA RUBBER CO., LTD., Hiroshima-ken (JP)

( * ) Notice: Subject to any disclaimer, the term of this patent is extended or adjusted under 35 U.S.C. 154(b) by 203 days.

(21) Appl. No.: 16/889,961

(22) Filed: Jun. 2, 2020

(65) Prior Publication Data

US 2020/0384839 A1 Dec. 10, 2020

(30) Foreign Application Priority Data

Jun. 10, 2019 (JP) ............................ JP2019-108301

(51) Int. Cl.

| | |
|---|---|
| ***B60J 10/90*** | (2016.01) |
| ***B60J 10/84*** | (2016.01) |
| ***B60J 10/86*** | (2016.01) |
| ***B60J 10/40*** | (2016.01) |
| ***B60J 10/25*** | (2016.01) |
| ***B60J 10/27*** | (2016.01) |
| ***B62D 33/03*** | (2006.01) |
| ***B60J 7/14*** | (2006.01) |

(Continued)

(52) U.S. Cl.

CPC ............... *B60J 10/90* (2016.02); *B60J 10/27* (2016.02); *B60J 10/40* (2016.02); *B60J 10/84* (2016.02); *B62D 33/0273* (2013.01); *B60J 7/141* (2013.01); *B60J 7/1621* (2013.01); *B60J 7/198* (2013.01); *B60J 10/25* (2016.02); *B60J 10/86* (2016.02); *B60P 7/02* (2013.01)

(58) Field of Classification Search

CPC .... B60P 7/02; B60J 7/041; B60J 7/141; B60J 7/198; B60J 7/1621; B60J 7/10; B60J 10/27; B60J 10/40; B60J 10/25; B60J 10/84; B60J 10/86; B60J 10/90; B62D 33/0273; B62D 33/03

USPC ......................................... 296/100.01–10.18

See application file for complete search history.

(56) References Cited

U.S. PATENT DOCUMENTS

| | | | | |
|---|---|---|---|---|
| 5,636,893 A * | 6/1997 | Wheatley | B60J 7/141 | 296/100.09 |
| 6,234,560 B1 * | 5/2001 | Hunt | B60J 7/041 | 296/100.07 |

(Continued)

FOREIGN PATENT DOCUMENTS

| | | |
|---|---|---|
| JP | 64056281 | 3/1989 |
| JP | 3033810 B2 | 4/1994 |

*Primary Examiner* — Gregory A Blankenship

(74) *Attorney, Agent, or Firm* — Holtz, Holtz & Volek PC

(57) ABSTRACT

A shutter couples to an upper part of a cargo bed by left and right tracks mounted on left and right side walls of the cargo bed. A tailgate is mounted on a rear end of the cargo bed. A bed liner seal member is provided on rear ends of the left and right side walls. A touch member provided on a rear part of the shutter makes elastic contact with the bed liner seal member when the shutter is fully extended. A shutter seal member provided on the shutter makes elastic contact with the tailgate. A tailgate seal member provided on the tailgate makes elastic contact with the bed liner seal member. First and second seal beads on an upper surface are provided on an upper wall of a protrusion of the bed liner seal member. The touch member touches the first and second seal beads.

8 Claims, 11 Drawing Sheets up
front
1
2
100
201
10
7
9
III
II
rear
5
8
301
Z
3
low

(51) Int. Cl.

| | |
|---|---|
| ***B60J 7/19*** | (2006.01) |
| ***B60J 7/16*** | (2006.01) |
| ***B62D 33/027*** | (2006.01) |
| *B60P 7/02* | (2006.01) |

(56) References Cited

U.S. PATENT DOCUMENTS

| | | | | |
|---|---|---|---|---|
| 6,908,139 | B1 * | 6/2005 | Szieff | B60J 7/041<br>296/37.16 |
| 10,538,150 | B2 * | 1/2020 | Zichettello | B60J 7/068 |
| 2011/0169296 | A1 * | 7/2011 | Schrader | B60J 7/102<br>296/100.18 |
| 2017/0136862 | A1 * | 5/2017 | Chung | B60P 7/02 |
| 2017/0240033 | A1 * | 8/2017 | Dylewski, II | B60J 7/141 |
| 2020/0384839 | A1 * | 12/2020 | Matsumoto | B60J 10/80 |
| 2021/0046812 | A1 * | 2/2021 | Hawkins | B32B 5/18 |

* cited by examiner

SEALING STRUCTURE FOR TRUCK CARGO BED WITH SHUTTER

CROSS REFERENCE TO RELATED APPLICATION

This application claims the benefit under 35 USC § 119 of JP Patent Application JP 2019-108301 filed Jun. 10, 2019, the entire disclosure of which is incorporated herein by reference.

BACKGROUND INFORMATION

The present invention relates to a sealing structure for a truck cargo bed with a shutter. The shutter couples to an upper part of the cargo bed and moves between at least two positions to open and close an opening of the cargo bed.

There are a variety of automobiles with a shutter 100 as illustrated in FIG. 1. The shutter 100 moves between at least two positions to open and close an opening on an upper part of a cargo bed 1.

The shutter 100 couples to the cargo bed 1 by a left track 201 and a right track 301. The left and right tracks 201, 301 are mounted on top edges of a left side wall 2 and a right side wall 3. The left and right side walls 2, 3 are vertically mounted on a left end and a right end of the cargo bed 1. A tailgate 5 is mounted on a rear end of the cargo bed 1 and is pivotal in a front and rear direction of an automobile body.

The tailgate 5 in a closed position and the left and right side walls 2, 3 surround the cargo bed 1. The shutter 100, when fully extended from a front part of the cargo bed 1 to the rear end, shuts an entire cargo area to close the opening on the upper part of the cargo bed 1.

There are a variety of sealing structures for surroundings of the tailgates.

For example, Japanese Unexamined Patent Application Publication No. 64-056281 is directed to a cover having three panels to cover the cargo bed. A gate is mounted on a rear part of the cargo bed and is pivotal in the front and rear direction of the automobile body. The gate, a left side wall surface, and a right side wall surface surround the cargo bed. A weather strip is attached to upper edges of the gate and the left and right side wall surfaces to seal a space between the cargo bed and the three panels when the cover is fully extended.

Japanese Patent No. 3033810 is directed to a fixed canopy, a movable canopy, and a back window glass to cover the cargo bed. The weather strip is attached to the fixed canopy and the movable canopy to seal a space between the canopies and the cargo bed or the back window glass.

Japanese Unexamined Patent Application Publication No. 64-056281 and Japanese Patent No. 3033810 are not directed to the truck cargo bed 1 with shutter 100 as illustrated in FIG. 1. In addition to the difference between shutter 100 and the members to cover the cargo bed, Japanese Unexamined Patent Application Publication No. 64-056281 and Japanese Patent No. 3033810 merely disclose the linear weather strips, and do not disclose the sealing structure for connecting parts among a plurality of members at upper parts of a left rear end and a right rear end of the cargo bed 1.

While the weather strip seals the linear space between the shutter 100 and tailgate 5 of the truck, a part Z in FIG. 1 is hard to seal, and water enters the cargo bed 1 through a space in the part Z. The part Z indicates the upper parts of the left and right rear ends of the cargo bed 1.

This configuration imposes limitations such as putting a cargo into a front part of the cargo bed 1 to protect the cargo from water.

Therefore, an object of the present invention is to provide a sealing structure excellent in sealing performance at the upper parts of the left and right rear ends of the cargo bed for the truck with the shutter.

SUMMARY

In order to achieve the above-mentioned object, according to one aspect of the invention, a sealing structure for a truck cargo bed with a shutter is provided. The sealing structure includes a cargo bed (1) for a truck, a shutter (100), a left side wall (2), a right side wall (3), a left track (201), a right track (301), and a tailgate (5). The shutter (100) couples to an upper part of the cargo bed (1) by the left and right tracks (201, 301), extends in parallel with the cargo bed (1), moves between at least two positions in a front and rear direction of an automobile body to open and close an opening on the upper part of the cargo bed (1). The left and right side walls (2, 3) are vertically mounted on a left end and a right end of the cargo bed (1). The left and right tracks (201, 301) are mounted on top edges of the left and right side walls (2, 3). The tailgate (5) is mounted on a rear end of the cargo bed (1) and is pivotal in a front and rear direction of an automobile body with a lower end part of the tailgate (5) as a pivotal axis. The tailgate (5) in a closed position and the left and right side walls (2, 3) surround the cargo bed (1).

A bed liner seal member (10) is provided on rear ends of the left and right side walls (2, 3).

A touch member (110) is provided on a left side end and a right side end of a rear part of the shutter (100), and makes elastic contact with the bed liner seal member (10) when the shutter (100) is fully extended.

A shutter seal member (120) is provided on a rear end of the shutter (100), and makes elastic contact with the tailgate (5) when the tailgate (5) is in the closed position.

A protrusion (11) forms a part of the bed liner seal member (10).

First and second seal beads (21, 22) on an upper surface are provided on an upper wall (12) of the protrusion (11), and extend in a right and left direction of the automobile body.

The touch member (110) touches the first and second seal beads (21, 22) from an upper side.

In addition, according to an aspect of the present invention, the sealing structure further includes a tailgate seal member (6). The tailgate seal member (6) is provided on an upper part of a front surface of the tailgate (5). The tailgate seal member (6) makes elastic contact with the bed liner seal member (10) when the tailgate (5) is in the closed position.

In addition, according to an aspect of the present invention, the sealing structure further includes third and fourth seal beads (23, 24) on a side surface. The third and fourth seal beads (23, 24) are provided on a side wall (13) of the protrusion (11) of the bed liner seal member (10), and extend in an upper and lower direction of the automobile body. The side wall (13) is close to an inner side of the cargo bed (1). The touch member (110) touches the third and fourth seal beads (23, 24) from a lateral side.

In addition, according to an aspect of the present invention, the first and second seal beads (21, 22) on the upper surface are two beads. The two beads are provided on the upper wall (12) of the protrusion (11) of the bed liner seal member (10) and are parallel with each other. The third and fourth seal beads (23, 24) on the side surface are two beads.

The two beads are provided on the side wall (13) of the protrusion (11) of the bed liner seal member (10) and are parallel with each other. The first and second seal beads (21, 22) are continuous with the third and fourth seal beads (23, 24).

In addition, according to an aspect of the present invention, the sealing structure further includes a first gutter (25) and a second gutter (27). The first gutter (25) is formed beneath the protrusion (11) of the bed liner seal member (10) and is closer to a front part of the automobile body than the protrusion (11). The first gutter (25) extends in the right and left direction of the automobile body. The second gutter (27) is formed beneath the third and fourth seal beads (23, 24) on the side surface and is closer to an interior of an automobile than the side wall (13) of the protrusion (11) of the bed liner seal member (10). The second gutter (27) extends in the front and rear direction of the automobile body and is continuous with the first gutter (25).

In addition, according to an aspect of the present invention, the sealing structure further includes a hole (29). The hole (29) is closer to a rear part of the automobile body than the second gutter (27). The hole (29) drains water guided into the first and second gutters (25, 27) toward an exterior of the automobile.

In addition, according to an aspect of the present invention, the touch member (110) includes an upper wall (111), a side wall (112), and an inner wall (113). The side wall (112) extends downward from a part of the upper wall (111) closest to the interior of the automobile and in the front and rear direction of the automobile body. The inner wall (113) extends downward from a part of the upper wall (111) closest to the front part of the automobile body and in the right and left direction of the automobile body. When the shutter (100) is fully extended, a lower surface of the upper wall (111) of the touch member (110) touches the first and second seal beads (21, 22) on the upper surface, an outer side surface of the side wall (112) touches the third and fourth seal beads (23, 24) on the side surface, a lower surface of the inner wall (113) makes elastic contact with a first wall (26), and a lower surface of the side wall (112) makes elastic contact with a second wall (28). The first wall (26) forms a part of the first gutter (25). The second wall (28) forms a part of the second gutter (27).

In addition, according to an aspect of the present invention, a lower end of the inner wall (113) of the touch member (110) is folded toward the front part of the automobile body such that the inner wall (113) has an L-shaped cross section.

Symbols in parentheses show constituents or items corresponding to the drawings.

According to the present invention, when the shutter is fully extended with the tailgate closed, the shutter seal member provided on the rear end of the shutter makes elastic contact with the tailgate. Also, the touch member provided on the left side end and the right side end of the rear part of the shutter touches the first and second seal beads on the upper surface. The first and second seal beads are provided on the upper wall of the protrusion of the bed liner seal member, and extend in the right and left direction of the automobile body.

With this configuration, upper parts of the rear ends of the left side wall and the right side wall of the cargo bed are sufficiently sealed, and infiltration of water into the cargo bed from the exterior of the automobile is prevented.

In addition, as measures against abrasion, the shutter touches the beads, and does not make elastic contact with lips or hollow members. The beads are increased in thickness and high in rigidity. The lips and the hollow members are reduced in thickness and low in rigidity. With this configuration, the beads, subjected to repeated elastic contact over a long period of time, are prevented from tears or damages. Even in case the beads are worn down, foams in the beads, which are increased in thickness and high in rigidity as compared with the lips or the hollow members, are hard to appear on a surface and do not degrade appearance.

In addition, the shutter seal member provided on the rear end of the shutter makes elastic contact with the tailgate seal member, not the tailgate directly. The tailgate seal member is provided on the upper part of the front surface of the tailgate. With this configuration, paint on tailgate, which is a member of the automobile body, is prevented from peeling off.

In addition, when the shutter is fully extended, the touch member of the shutter also touches the third and fourth seal beads on the side surface. The third and fourth seal beads are provided on the side wall of the protrusion of the bed liner seal member, and extend in the upper and lower direction of the automobile body. With this configuration, sealing function is further improved.

In addition, the first and second seal beads on the upper surface are the two beads parallel with each other. The third and fourth seal beads on the side surface are the two beads parallel with each other. The first and second seal beads are continuous with the third and fourth seal beads. With this configuration, the upper parts of the rear ends are sufficiently sealed without a break.

In addition, the first gutter is formed beneath the protrusion of the bed liner seal member and is closer to the front part of the automobile body than the protrusion. The first gutter extends in the right and left direction of the automobile body. The second gutter is formed beneath the third and fourth seal beads on the side surface and is closer to the interior of the automobile than the side wall of the protrusion of the bed liner seal member. The second gutter extends in the front and rear direction of the automobile body and is continuous with the first gutter. With this configuration, water around the bed liner seal member is guided into the first gutter and the second gutter. Especially, with the configuration that the first and second seal beads on the upper surface are continuous with the third and fourth seal beads, a channel between the two beads weakens force of water which passes through the channel, and guides water into the first gutter. With this configuration, water is prevented from splashing.

In addition, the hole closer to the rear part of the automobile body than the second gutter drains water guided into the first and second gutters toward the exterior of the automobile. With this configuration, water does not collect on the first or second gutter or overflow.

In addition, the touch member includes the upper wall, the side wall, and the inner wall. When the shutter is fully extended, the lower surface of the upper wall of the touch member touches the first and second seal beads on the upper surface, and the outer side surface of the side wall touches the third and fourth seal beads on the side surface. With this configuration, the upper parts of the rear ends are stably sealed. Also, the lower surface of the inner wall makes elastic contact with the first wall, and the lower surface of the side wall makes elastic contact with the second wall. With this configuration, infiltration of water into the cargo bed from the first gutter or the second gutter is prevented.

In addition, the lower end of the inner wall of the touch member is folded toward the front part of the automobile body such that the inner wall has the L-shaped cross section.

With this configuration, when the shutter is extended toward the rear part of the automobile body from the front part to close the opening of the cargo bed, the lower end of the inner wall of the touch member is not unnecessarily bent, by catching the first wall.

DETAILED DESCRIPTION

Figure 1:
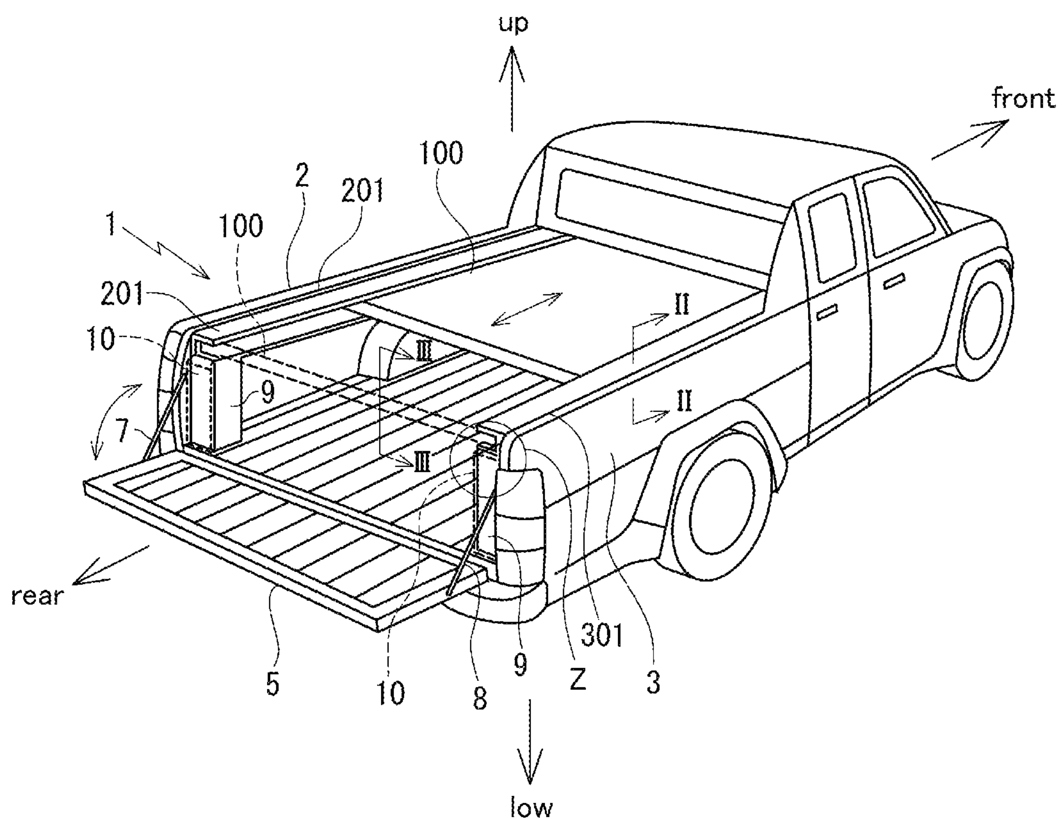
FIG. 1 is a perspective view of a truck with a shutter.

Referring to the Drawings, a sealing structure according to an embodiment of the present invention for a truck cargo bed with a shutter will be described.

The sealing structure is primarily for use on upper parts of a left rear end and a right rear end of a cargo bed 1 (part Z in FIG. 1) for a truck with a shutter 100 on an upper part of the cargo bed 1 as illustrated in FIG. 1. The shutter 100 extends in parallel with the cargo bed 1, and moves between at least two positions in a front and rear direction of an automobile body to open and close an opening on the upper part of the cargo bed 1.

The shutter 100 is made of metal including an aluminum plate. The shutter 100 couples to the upper part of the cargo bed 1 by a left track 201 and a right track 301. The left and right tracks 201, 301 are mounted on top edges of a left side wall 2 and a right side wall 3. The left and right side walls 2, 3 are vertically mounted on a left end and a right end of the cargo bed 1.

Figure 2:
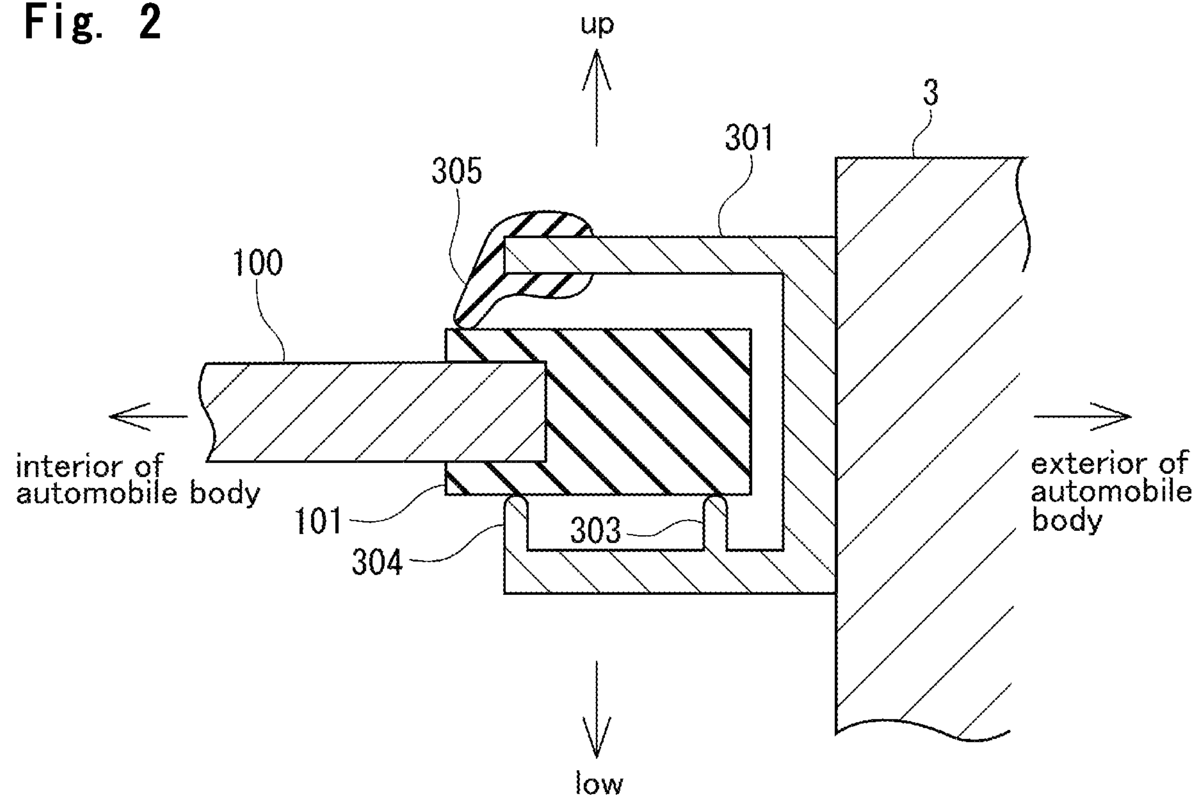
FIG. 2 is an enlarged cross-sectional view of the truck with the shutter taken along line II-II of FIG. 1.

As illustrated in FIG. 2, which is an enlarged cross-sectional view of the truck with the shutter taken along line II-II of FIG. 1, the right track 301 has a U-shaped cross section with an opening on an inner side. An end cap 101 is fit on a right side surface of the shutter 100, and is inserted into the right track 301 from the opening. The end cap 101 is made of resin. Projections 303, 304 are formed on a lower part on an inner side of the right track 301 and support a lower surface of the end cap 101.

A seal lip 305 is provided on an end of an upper part on the inner side of the right track 301, and seals a space between the right track 301 and the end cap 101 by making elastic contact with an upper surface of the end cap 101.

Illustration and explanations on the left track 201 are omitted for the left track 201 is completely symmetrical with the right track 301.

Figure 3:
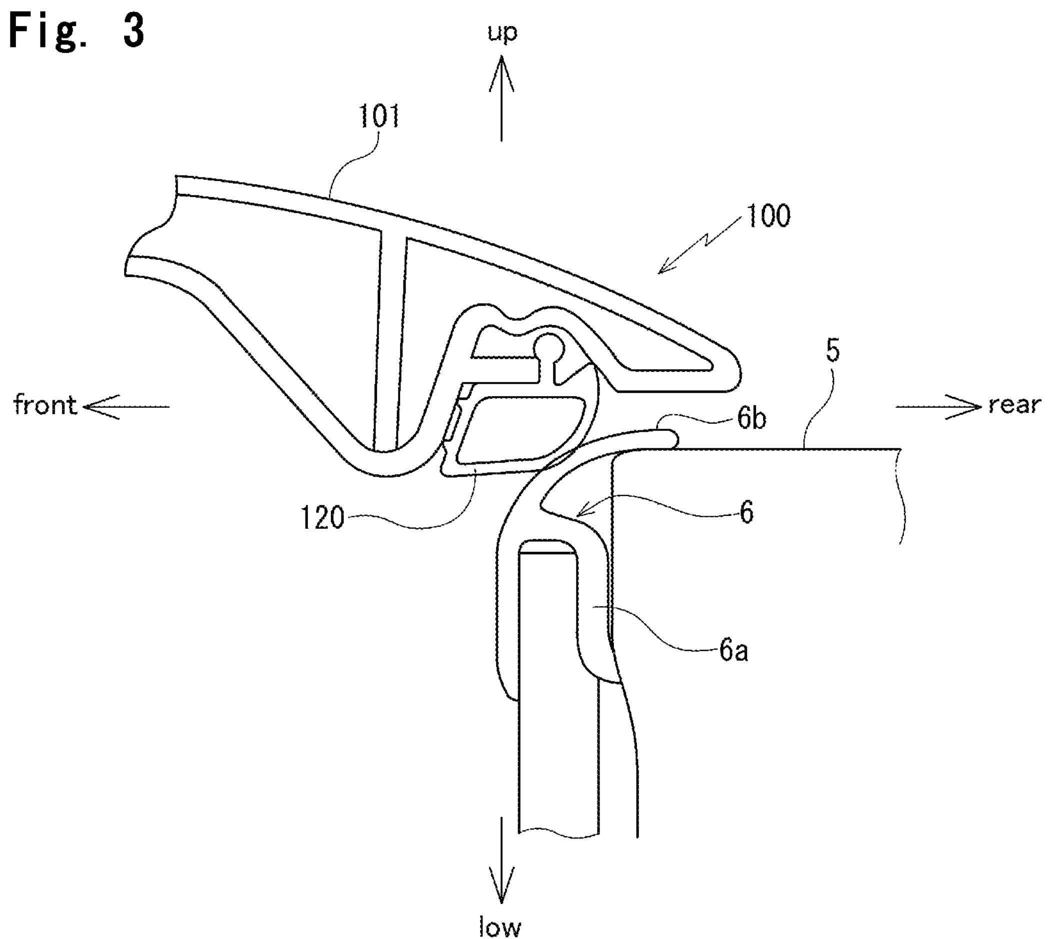
FIG. 3 is the enlarged cross-sectional view of the truck with the shutter taken along line III-III of FIG. 1 with the shutter and a tailgate closed.

As illustrated in FIG. 1 and FIG. 3, which is the enlarged cross-sectional view of the truck with the shutter taken along line III-III of FIG. 1, a tailgate 5 is mounted on a rear end of the cargo bed 1. A stay 7 connects a center of a left end of the tailgate 5 with a center of a rear end of the left side wall 2. A stay 8 connects a center of a right end of the tailgate 5 with a center of rear end of the right side wall 3. The tailgate 5 is pivotal in the front and rear direction of the automobile body with a lower end part of the tailgate 5 as a pivotal axis. The tailgate 5 in a closed position and the left and right side walls 2, 3 surround the cargo bed 1.

The shutter 100, when fully extended with the left and right side walls 2, 3 as well as the tailgate 5 in the closed position surrounding the cargo bed 1, covers an entire opening of the cargo bed 1 as illustrated by a broken line in FIG. 1.

As illustrated in FIG. 3, a shutter seal member 120 is provided on a rear end of the shutter 100. The shutter seal member 120 faces downward, is hollow, and extends in a right and left direction of the automobile body. The shutter seal member 120 makes elastic contact with a tailgate seal member 6 when the tailgate 5 is in the closed position and prevents infiltration of water from a space between the shutter 100 and the tailgate 5. The tailgate seal member 6 is provided on an upper part of a front surface of the tailgate 5. The tailgate seal member 6 includes an installation base member 6*a* and a seal lip 6*b*. The installation base member 6*a* has a U-shape with an opening on a lower end. The seal lip 6*b* extends from an upper wall of the installation base member 6*a* and makes elastic contact with the shutter seal member 120 directly.

As illustrated in FIG. 1, a bed liner 9 on the left and a bed liner 9 on the right are provided on the rear ends of the left and right side walls 2, 3, which are vertically mounted on the left end and the right end of the cargo bed 1. The bed liners 9 protrude toward an inner side of the cargo bed 1. A bed liner seal member 10 is provided on rear side surfaces of the bed liners 9.

Figure 4:
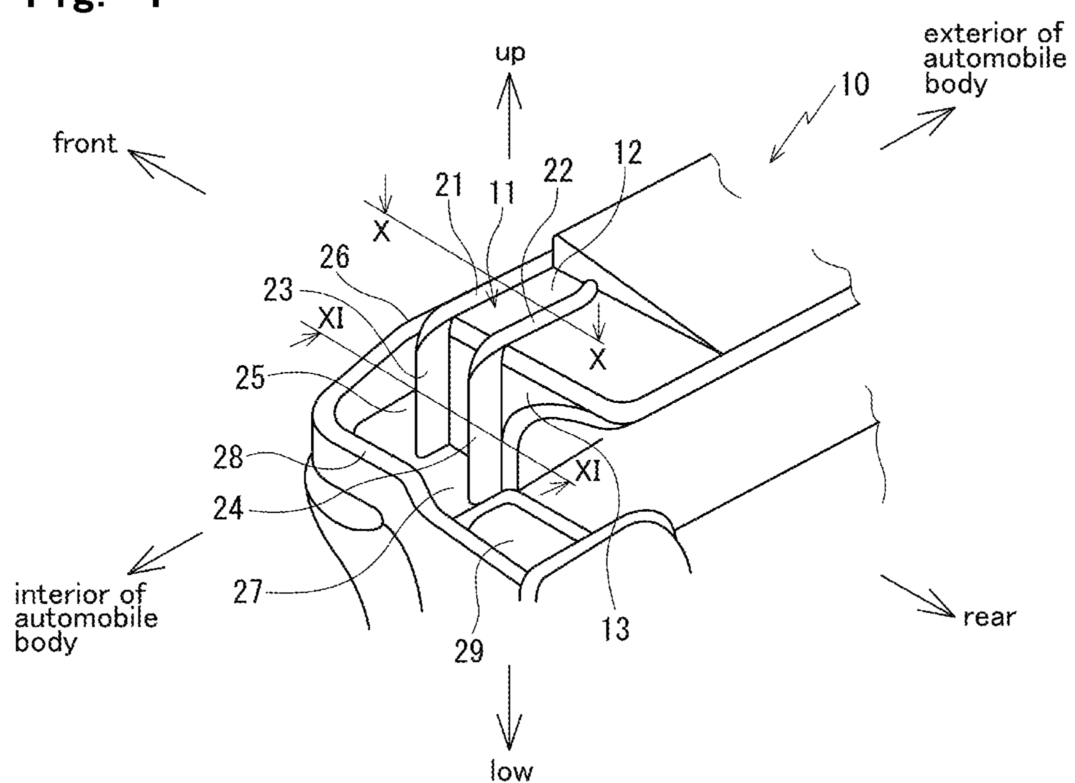
FIG. 4 is an enlarged perspective view of an important part of a bed liner seal member illustrated in FIG. 1.

As illustrated in FIG. 4, the bed liner seal member 10 includes a protrusion 11. The protrusion 11 has a shape of a quadrangular prism and protrudes upward. While in FIG. 9, an insert 15 is embedded in the bed liner seal member 10 to increase rigidity of the bed liner seal member 10, this should not be construed in a limiting sense. Another possible embodiment is that an outsert is embedded in the bed liner seal member 10 instead of the insert 15. Still another possible embodiment is that the outsert as well as the insert 15 is embedded in the bed liner seal member 10.

As illustrated in FIG. 4, first and second seal beads 21, 22 on an upper surface are provided on an upper wall 12 of the protrusion 11. The first and second seal beads 21, 22 are parallel with each other and extend in a right and left direction of the automobile body. Also, third and fourth seal bead 23, 24 on a side surface are provided on a side wall 13 of the protrusion 11. The third and fourth seal bead 23, 24 are parallel with each other and extend in an upper and lower direction of the automobile body. The side wall 13 is close to an inner side of the cargo bed 1.

Material for use as the bed liner seal member 10 includes rubber-like elastic body. Examples of the rubber-like elastic body include synthetic rubber material such as EPDM. Examples of the rubber-like elastic body also include thermoplastic resin such as olefinic thermoplastic resin. The rubber-like elastic body may be foamed or non-foamed depending on hardness of the material. Alternatively, foamed rubber-like elastic body or non-foamed rubber-like elastic body may be used according to a position in the sealing structure.

Figure 10:
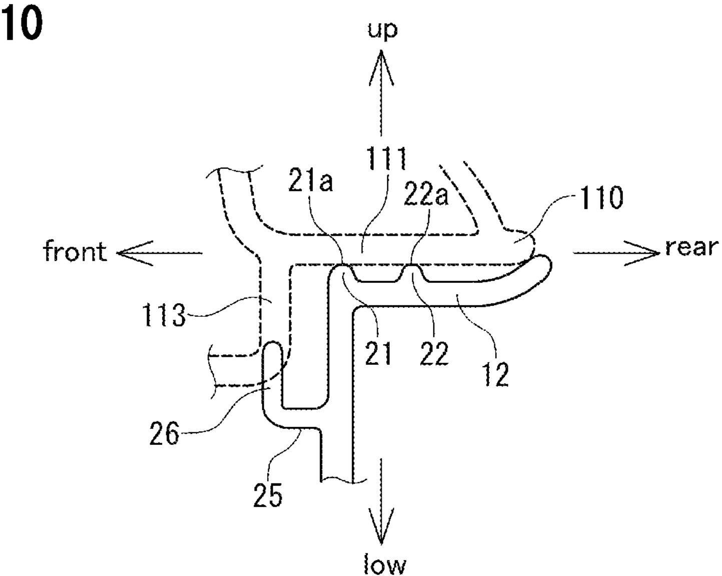
FIG. 10 is an enlarged cross-sectional view of the bed liner seal member taken along line X-X of FIG. 4.

An interval between the first and second seal beads 21, 22 is the same as an interval between the third and fourth seal beads 23, 24, and forms a channel. The first seal bead 21 is continuous with the third seal bead 23. The first and third seal beads 21, 23 are close to a front part of the automobile body. The second seal bead 22 is continuous with the fourth seal bead 24. The second and fourth seal beads 22, 24 are close to a rear part of the automobile body. A connecting part between the first and third seal beads 21, 23 and a connecting part between the second and fourth seal beads 22, 24 are chamferred off and have curved surfaces (round surfaces). As illustrated in FIG. 10, which is an enlarged cross-sectional view of the bed liner seal member taken along line X-X of FIG. 4, the first and second seal beads 21, 22 are longer in width in the front and rear direction of the automobile body than height in the upper and lower direction of the automobile body.

Another possible embodiment is that the first and second seal beads 21, 22 have the same length in width and height. Still another possible embodiment is that the first and second seal beads 21, 22 are longer in height than width. But the first and second seal beads 21, 22, which are longer in width than height, are improved in rigidity and prevented from abrasion, and therefore, are more preferable.

Figure 11:
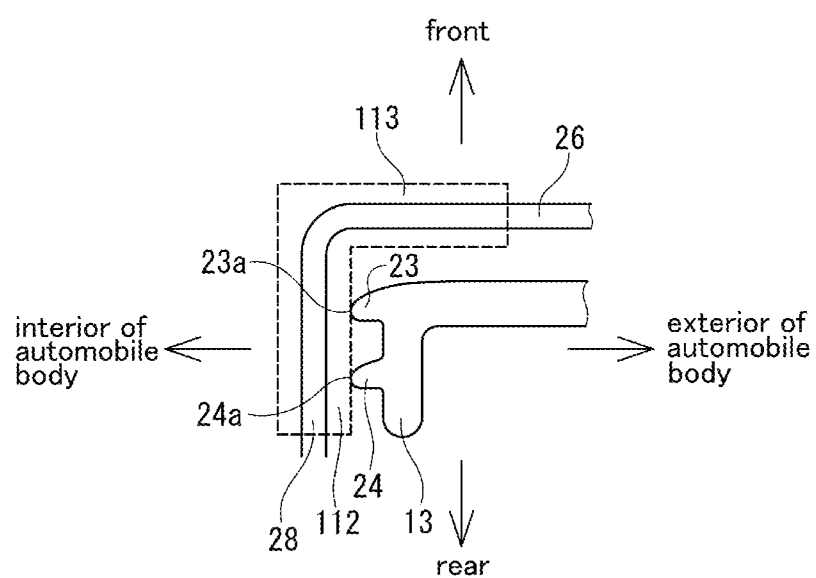
FIG. 11 is the enlarged cross-sectional view of the bed liner seal member taken along line XI-XI of FIG. 4.

As illustrated in FIG. 11, which is the enlarged cross-sectional view of the bed liner seal member taken along line XI-XI of FIG. 4, base roots of the third and fourth seal beads 23, 24 are increased in thickness as compared with top ends. Also, the top ends of the third and fourth seal beads 23, 24 gradually lean toward the rear part of the automobile from the front part.

As illustrated in FIGS. 4 and 10, a first gutter 25 is formed beneath the protrusion 11 of the bed liner seal member 10 and is closer to the front part of the automobile body than the protrusion 11. The first gutter 25 extends in the right and left direction of the automobile body. The first gutter 25 is formed between a first wall 26 and a wall of the protrusion 11 closest to the front part of the automobile body. The first wall 26 extends in the right and left direction of the automobile body, and is higher than a bottom surface of the first gutter 25 and lower than an upper wall 12 of the protrusion 11.

As illustrated in FIG. 4, a second gutter 27 is formed closer to the interior of the automobile than the side wall 13 of the protrusion 11 of the bed liner seal member 10. The second gutter 27 extends in the front and rear direction of the automobile body. The second gutter 27 is formed between a second wall 28 and the side wall 13 of the protrusion 11. The second wall 28 extends in the front and rear direction of the automobile body, and is higher than a bottom surface of the second gutter 27 and lower than the upper wall 12 of the protrusion 11.

The second gutter 27 is formed beneath the third and fourth seal beads 23, 24, and lower ends of the third and fourth seal beads 23, 24 connect with the bottom surface of the second gutter 27.

The first gutter 25 and the second gutter 27 are continuous and form an L-shape. The bottom surface is gently lowered toward the second gutter 27 from the first gutter 25. In addition, a hole 29 is formed on an extension of the second gutter 27, that is a position closer to the rear part of the automobile body than the second gutter 27. The hole 29 drains water guided into the first and second gutters 25, 27 toward an exterior of the automobile. The first wall 26 and the second wall 28 are connected with each other and continuous.

Figure 6:
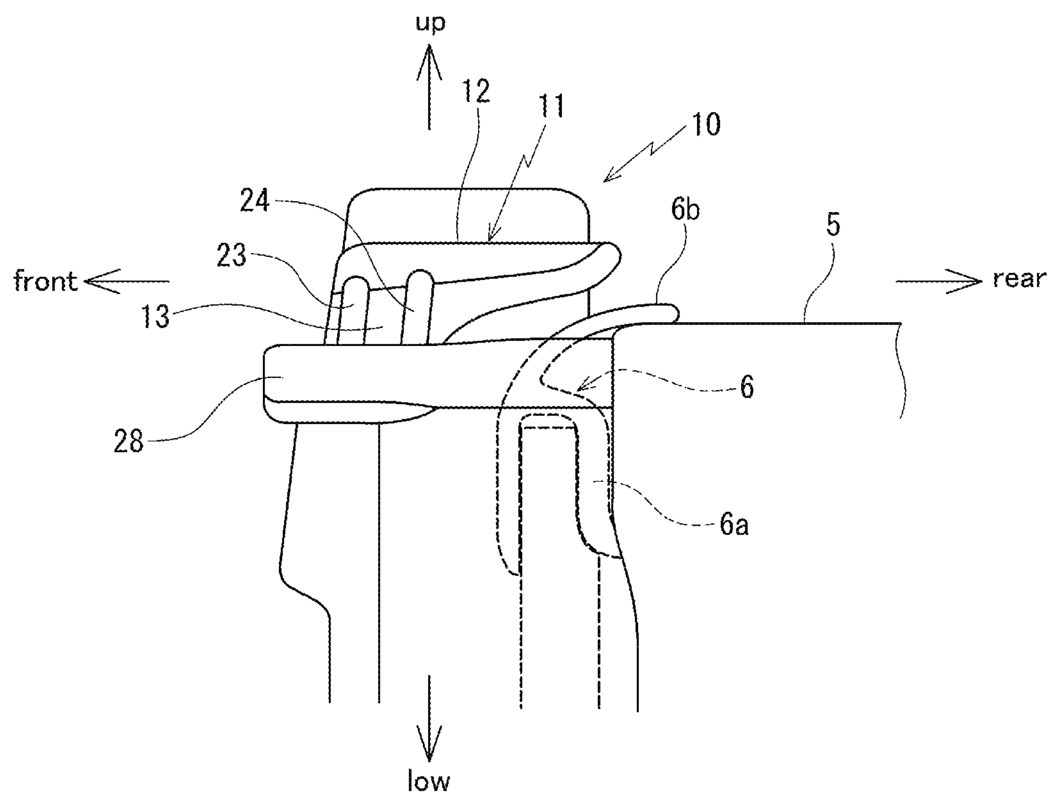
FIG. 6 is an enlarged side view of the bed liner seal member illustrated in FIG. 1 with the bed liner seal member in elastic contact with the tailgate.

On a left end and a right end of the automobile body as illustrated in FIG. 6, the seal lip 6*b* of the tailgate seal member 6 directly makes elastic contact with a rear part of the bed liner seal member 10 relative to the automobile body.

The shutter seal member 120 and the tailgate seal member 6 may be made of the same material as the bed liner seal member 10.

An extra member high in rigidity may be embedded in the installation base member 6*a* of the tailgate seal member 6.

Figure 5:
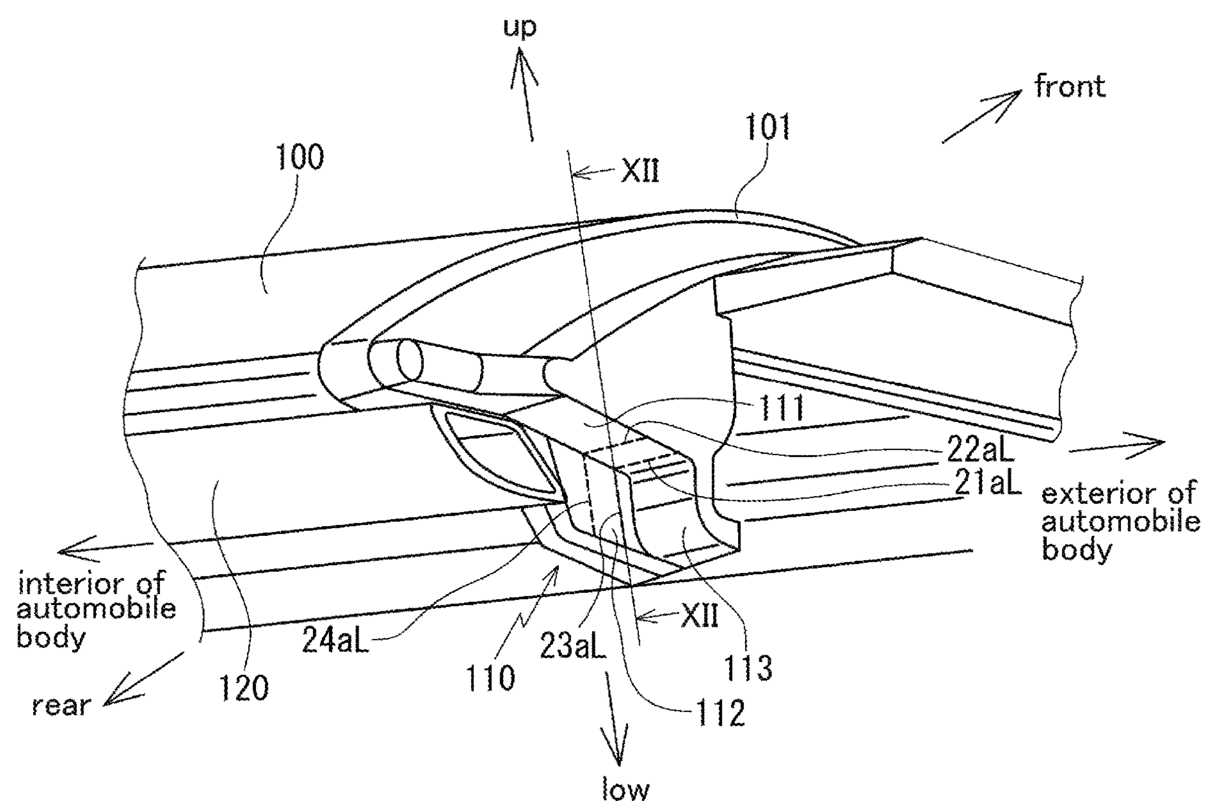
FIG. 5 is an enlarged perspective view of a side end of a rear part of the shutter illustrated in FIG. 1.

As illustrated in FIG. 5, a touch member 110 is provided on a left side end and a right side end of a rear part of the shutter 100, and makes elastic contact with the bed liner seal member 10 when the shutter 100 is fully extended.

The touch member 110 is integrally formed with a left side end and a right side end of a rear part of the end cap 101, made of resin. The touch member 110 includes an upper wall 111, a side wall 112, and an inner wall 113. The side wall 112 extends downward from a part of the upper wall 111 closest to the interior of the automobile and in the front and rear direction of the automobile body. The inner wall 113 extends downward from a part of the upper wall 111 closest to the front part of the automobile body and in the right and left direction of the automobile body. Also, the lower end of the inner wall 113 is folded toward the front part of the automobile body such that the inner wall 113 has an L-shaped cross section. A lower surface of the inner wall 113 is as high as a lower surface of the side wall 112 and the lower surfaces form a uniform surface.

Figure 7:
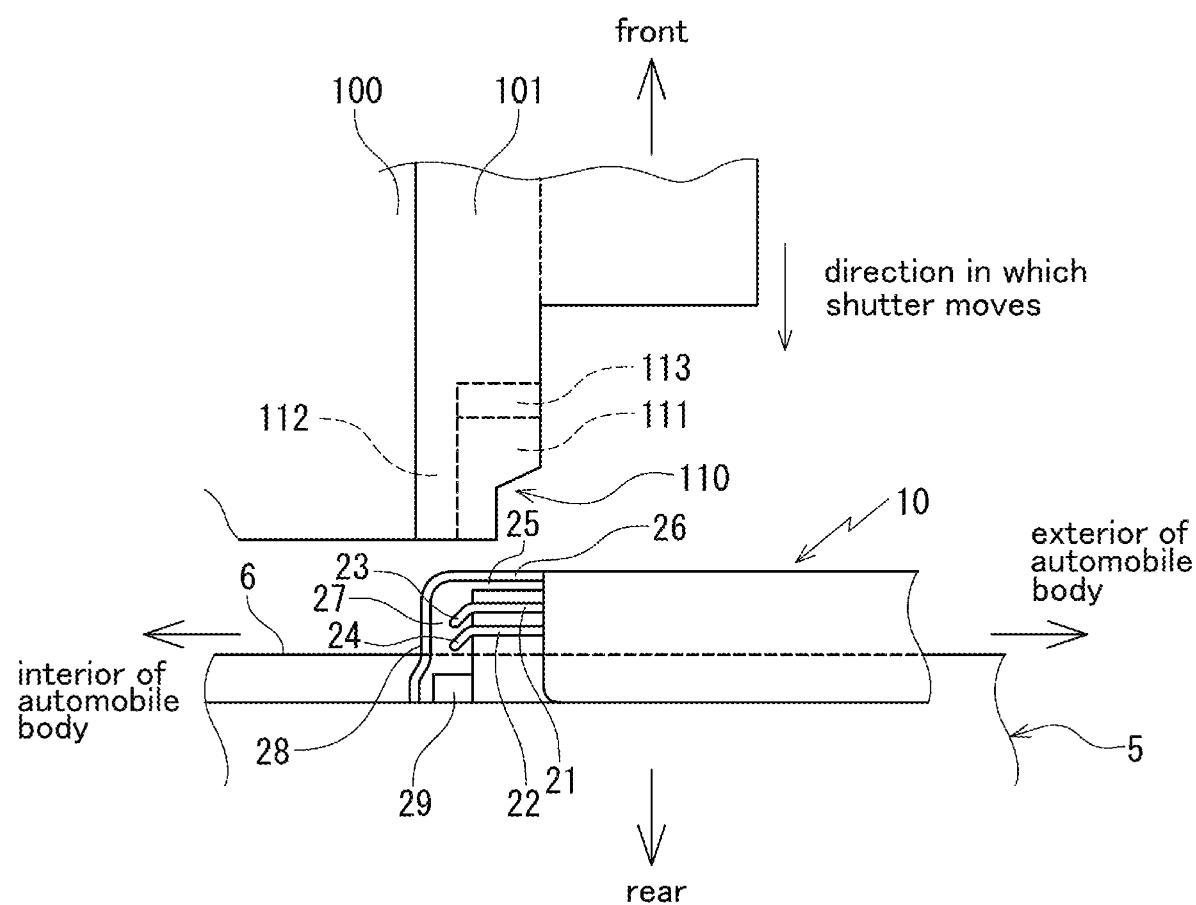
FIG. 7 is an enlarged plan view of the shutter illustrated in FIG. 1 with the shutter extended toward a rear part of an automobile body and out of elastic contact with the bed liner seal member.
Figure 9:
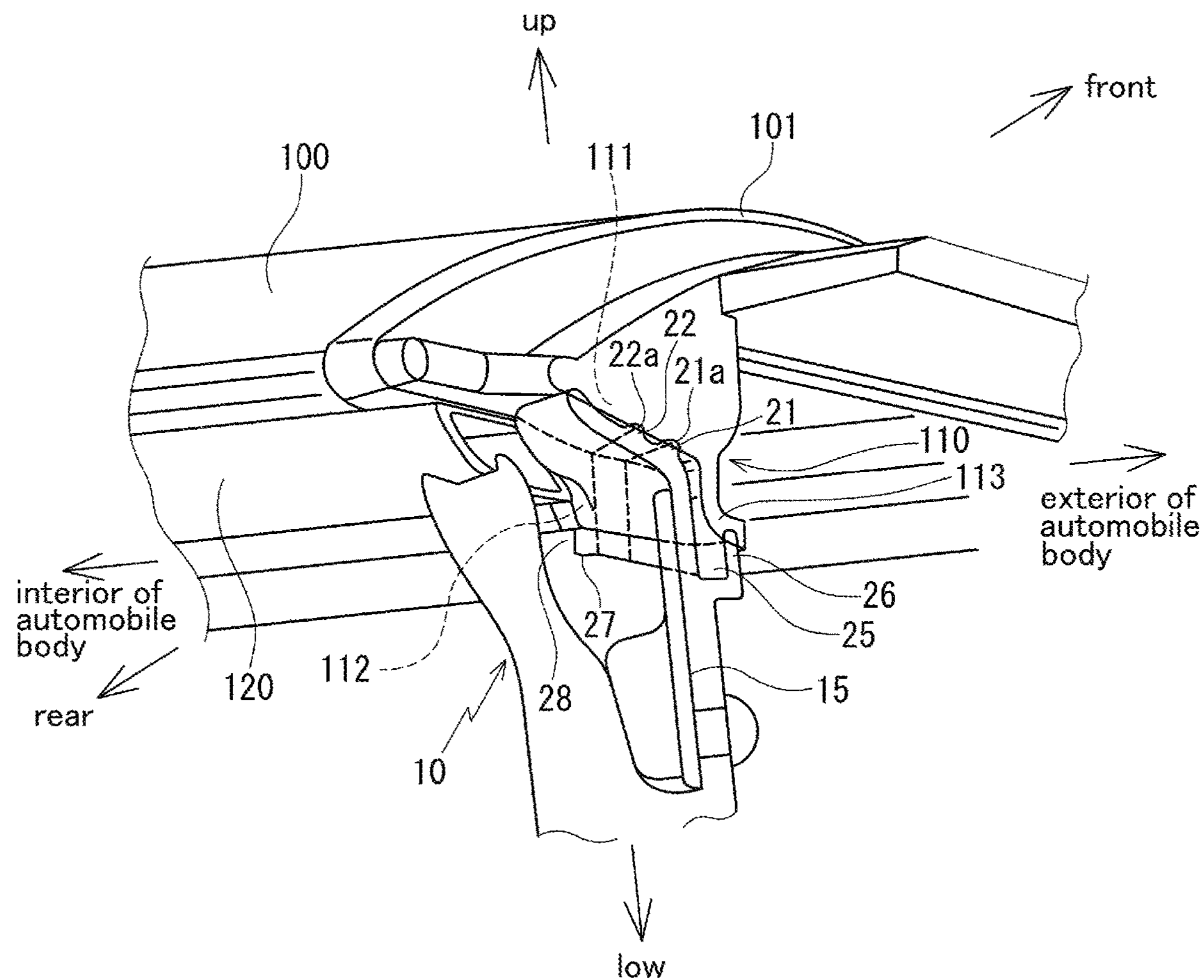
FIG. 9 is an enlarged perspective view of an important part of the shutter illustrated in FIG. 1 with the shutter extended toward the rear part of the automobile body and in elastic contact with the bed liner seal member.
Figure 13:
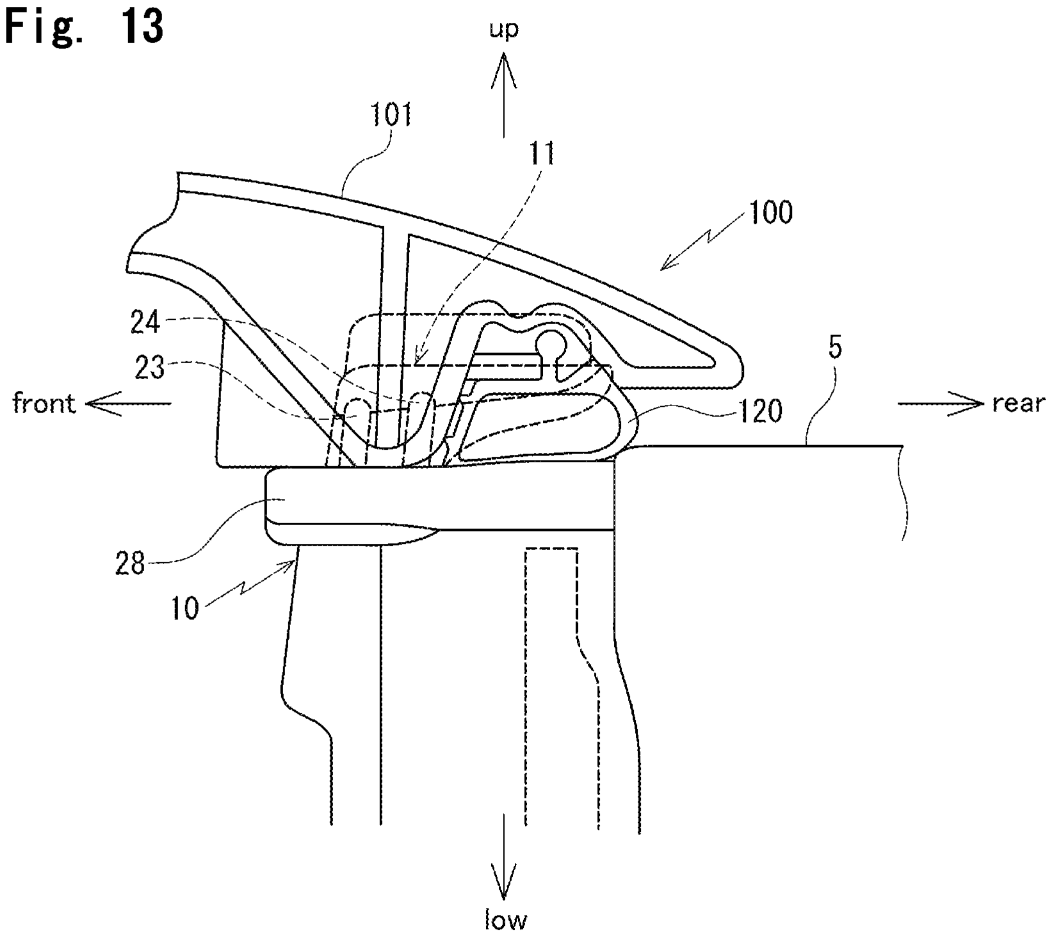
FIG. 13 is the enlarged side view of the shutter illustrated in FIG. 1 with the shutter extended toward the rear part of the automobile body and in elastic contact with the tailgate.

When the shutter 100 closes the opening of the cargo bed 1 as illustrated in FIG. 13 after the shutter 100 is extended toward the rear part of the automobile body from the front part as illustrated in FIG. 7, the shutter 100 makes elastic contact with the bed liner seal member 10 as illustrated in FIG. 9. Specifically, the lower surface of the upper wall 111 of the touch member 110 touches, not compresses, the first and second seal beads 21, 22 from an upper side, and an outer side surface of the side wall 112 of the touch member 110 touches, not compresses, the third and fourth seal beads 23, 24 from a lateral side. Also, the lower surface of the inner wall 113 of the touch member 110 makes elastic contact with the first wall 26, which forms a part of the first gutter 25, from the upper side, and the lower surface of the side wall 112 of the touch member 110 makes elastic contact with the second wall 28, which forms a part of the second gutter 27.

While in the present embodiment, as illustrated in FIG. 9, the upper wall 111 and the side wall 112 of the touch member 110 touch, not compress, the first and second seal beads 21, 22 and the third and fourth seal beads 23, 24, respectively, this should not be construed in a limiting sense. Another possible embodiment is that the upper wall 111 and the side wall 112 slightly compress the first and second seal beads 21, 22 and the third and fourth seal beads 23, 24, respectively.

With the configuration of the present embodiment, the seal beads 21, 22, 23, 24 are hard to wear down even after the shutter 100 opens and closes the opening of the cargo bed 1 repeatedly.

In addition, it is possible that the seal beads 21, 22, 23, 24 do not touch the touch member 110 and a small space remains between the touch member 110 and the seal beads 21, 22, 23, 24 due to deviation in positional relation among the bed liner seal member 10, the cargo bed 1, and the shutter 100 as well as deviation in shape or size. Even in case the small space remains, since the first and second seal beads 21, 22 are continuous with the third and fourth seal beads 23, 24, the channel between the two beads weakens force of water which passes through the channel and guides water into the first gutter 25. With this configuration, water is prevented from splashing.

In addition, the hole 29 closer to the rear part of the automobile body than the second gutter 27 drains water guided into the first and second gutters 25, 27 toward the exterior of the automobile. With this configuration, water does not collect on the first or second gutter 25, 27 or overflow.

Another possible embodiment is that the upper wall 111 and the side wall 112 of the touch member 110 are slightly closer to the seal beads 21, 22, 23, 24 to increase elastic contact force. But the upper wall 111 and the side wall 112 of the touch member 110 preferably approach the seal beads 21, 22, 23, 24 to the extent not to damage the seal beads 21, 22, 23, 24 in consideration of the deviation in positional relation.

FIG. 5 illustrates imaginary lines 21*a*L, 22*a*L, 23*a*L, 24*a*L with broken lines on the touch member 110. The imaginary lines 21*a*L, 22*a*L, 23*a*L, 24*a*L are positions on the touch member 110 which top ends 21*a*, 22*a*, 23*a*, 24*a* of the seal beads 21, 22, 23, 24 touch, not compress, respectively, when the shutter 100 is fully extended.

According to the embodiment of the present invention, the tailgate 5 in the closed position as illustrated in FIG. 3 makes elastic contact with the bed liner seal member 10, provided on the rear ends of the left and right side walls 2, 3.

When the shutter 100 is fully extended with the tailgate 5 closed, the shutter seal member 120, provided on the rear end of the shutter 100, makes elastic contact with the tailgate 5 as illustrated in FIG. 13. Also, as illustrated in FIG. 10 and FIG. 11, the touch member 110, provided on the left side end and the right side end of the rear part of the shutter 100, touches, not compresses, the first and second seal beads 21, 22 and the third and fourth seal beads 23, 24. The first and second seal beads 21, 22 are provided on the upper wall 12 of the protrusion 11 of the bed liner seal member 10. The third and fourth seal beads 23, 24 are provided on the side wall 13 of the protrusion 11 of the bed liner seal member 10. With this configuration, the upper parts of the rear ends of the left and right side walls 2, 3 of the cargo bed 1 are sufficiently sealed, and infiltration of water into the cargo bed 1 from the exterior of the automobile is prevented.

Figure 8:
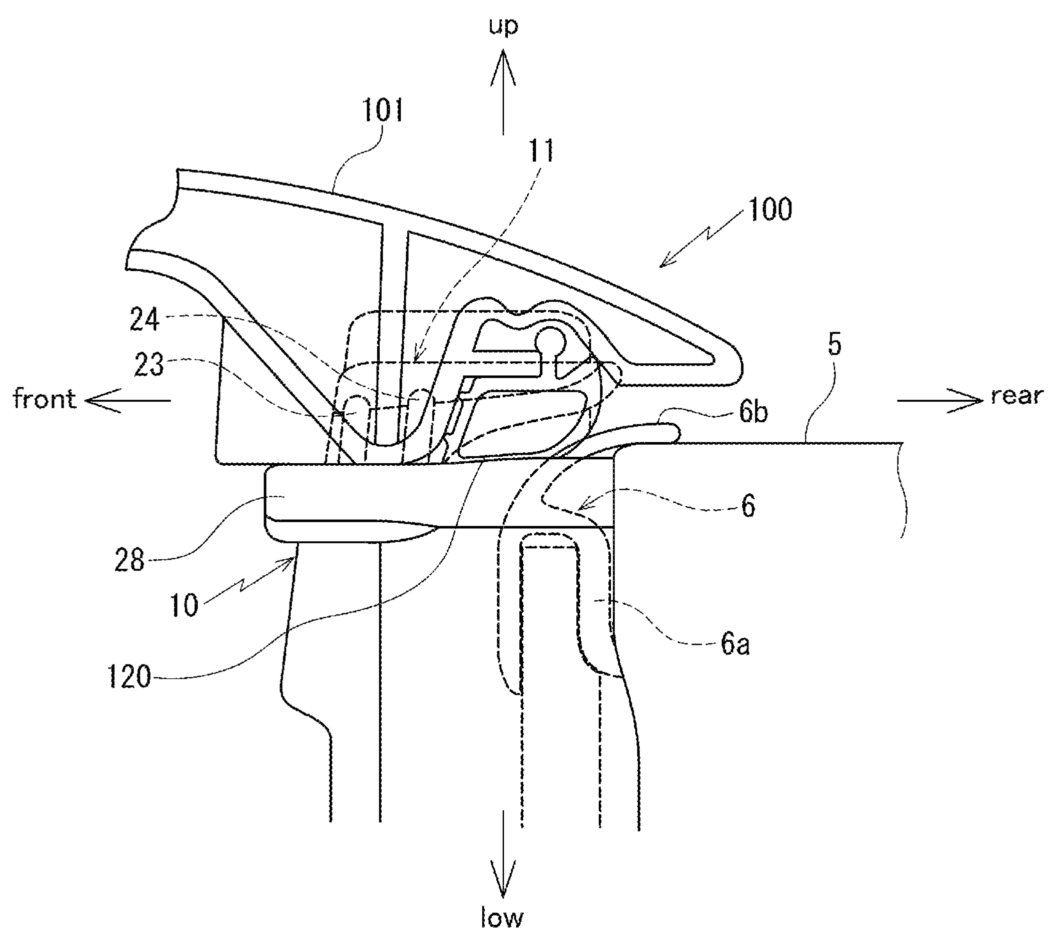
FIG. 8 is an enlarged side view of the shutter illustrated in FIG. 1 with the shutter extended toward the rear part of the automobile body and in elastic contact with a tailgate seal member.

Another possible embodiment is that the shutter seal member 120, provided on the rear end of the shutter 100, makes elastic contact with the tailgate seal member 6 as illustrated in FIG. 8, not the tailgate 5 directly. The tailgate seal member 6 is provided on the upper part of the front surface of the tailgate 5. With this configuration, paint on tailgate 5, which is a member of the automobile body, is prevented from peeling off.

Specifically, a hollow part of the shutter seal member 120 illustrated in FIG. 13, which makes elastic contact with the upper part of the front surface of the tailgate 5 directly, is miniaturized. Next, the tailgate seal member 6 is provided on the upper part of the front surface of the tailgate 5. With this configuration, the shutter seal member 120 makes elastic contact with the tailgate seal member 6 when the shutter 100 is fully extended.

More specifically, a flange is formed close to the upper part of the front surface of the tailgate 5. The flange has an opening on an upper part. The tailgate seal member 6 includes the installation base member 6*a* and the seal lip 6*b*. The installation base member 6*a* has the U-shape with an opening on the lower end and couples to the flange. The seal lip 6*b* extends diagonally rearward relative to the automobile body from the upper wall of the installation base member 6*a* and makes elastic contact with the upper part of the tailgate 5. When the shutter 100 is fully extended, the shutter seal member 120 makes elastic contact with the seal lip 6*b*, which makes elastic contact with the upper part of the tailgate 5. As a result, the shutter seal member 120 indirectly seals a space between the rear part of the shutter 100 and the upper part of the tailgate 5 with the tailgate seal member 6 sandwiched between the shutter seal member 120 and the tailgate 5.

In addition, as measures against abrasion, the touch member 110 of the shutter 100 touches, not compresses, the seal beads 21, 22, 23, 24, which are increased in thickness and high in rigidity and does not make elastic contact with lips or hollow members which are reduced in thickness and low in rigidity. With this configuration, the beads 21, 22, 23, 24, subjected to repeated elastic contact over a long period of time, are prevented from tears or damages. Even in case the beads are worn down, foams in the beads 21, 22, 23, 24, which are increased in thickness and high in rigidity as compared with the lips and the hollow members, are hard to appear on a surface and do not degrade appearance.

In addition, as illustrated in FIG. 4, the first gutter 25 is formed beneath the protrusion 11 of the bed liner seal member 10 and is closer to the front part of the automobile body than the protrusion 11. The first gutter 25 extends in the right and left direction of the automobile body. The second gutter 27 is formed beneath the third and fourth seal beads 23, 24 on the side surface and is closer to the interior of the automobile than the side wall 13 of the protrusion 11 of the bed liner seal member 10. The second gutter 27 extends in the front and rear direction of the automobile body and is continuous with the first gutter 25. With this configuration, water around the bed liner seal member 10 is guided into the first gutter 25 and the second gutter 27. In addition, with the configuration that the first and second seal beads 21, 22 are continuous with the third and fourth seal beads 23, 24, the channel between the two beads weakens force of water which passes through the channel, and guides water into the first gutter 25. As a result, water is prevented from splashing. In addition, the hole 29, closer to the rear part of the automobile body than the second gutter 27, drains water guided into the first and second gutters 25, 27 toward the exterior of the automobile. With this configuration, water does not collect on the first or second gutter 25, 27 or overflow.

In addition, when the shutter 100 is fully extended, the lower surface of the upper wall 111 of the touch member 110 touches, not compresses, the first and second seal beads 21, 22 as illustrated in FIG. 10, and the outer side surface of the side wall 112 of the touch member 110 touches, not compresses, the third and fourth seal beads 23, 24 as illustrated in FIG. 11. With this configuration, the upper parts of the rear ends of the cargo bed 1 are stably sealed. Also, the lower surface of the inner wall 113 of the touch member 110 makes elastic contact with the first wall 26 and the lower surface of the side wall 112 of the touch member 110 makes elastic contact with the second wall 28. With this configuration, infiltration of water into the cargo bed 1 from the first gutter 25 or the second gutter 27 is prevented.

Figure 12:
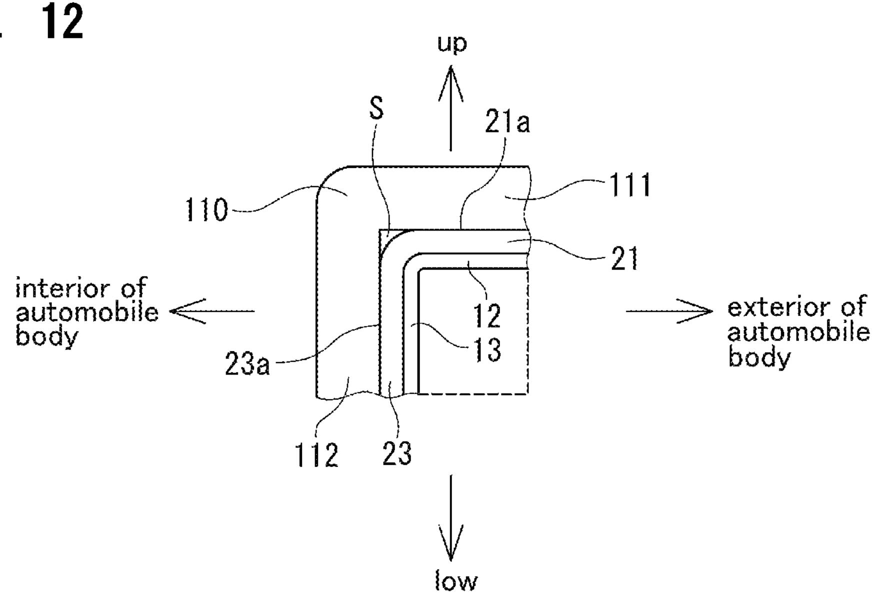
FIG. 12 is the enlarged cross-sectional view of the side end of the rear part of the shutter taken along line XII-XII of FIG. 5.

In the present embodiment, as illustrated in FIG. 12, which is an enlarged cross-sectional view of the side end of the rear part of the shutter 100 taken along line XII-XII of FIG. 5, a space S remains between the connecting part of the seal beads and a connecting part of the upper wall 111 with the side wall 112. This is because an inner-cabin side surface of the connecting part between the first seal bead 21 and the third seal bead 23 is chamferred off and has the round surface in rear view for the bed line seal member 10 is formed by die-molding. On the other hand, an outer-cabin side surface of the connecting part of the upper wall 111 with the side wall 112 is formed into a pin corner in rear view, not chamferred off or formed into the round surface.

In case high pressure water splashes the automobile while washing the automobile and advances toward the space S, the inner wall 113 of the touch member 110 dams up water. The inner wall 113 is closer to the front part of the automobile body than the space S. Also, the inner wall 113 is connected with the upper wall 111 and the side wall 112, the lower end of the inner wall 113 makes elastic contact with the first wall 26, and the lower end of the side wall 112 makes elastic contact with the second wall 28. With this configuration, water flows along the first and second gutters 25, 27 and is certainly drained toward the exterior of the automobile from the hole 29.

While in the present embodiment, the touch member 110 of the shutter 100 touches, not compresses, the first and second seal beads 21, 22 and the third and fourth seal beads 23, 24, this should not be construed in a limiting sense. Another possible embodiment is that the touch member 110 touches, not compresses, a singular seal bead on the upper surface and a singular seal bead on the side surface, which are continuous with each other. Still another possible embodiment is that the touch member 110 touches, not compresses, the singular seal bead on the upper surface or two seal beads on the upper surface (the seal bead on the side surface not provided). With this configuration also, an excellent sealing function is achieved.

Still another possible embodiment is that the first and second gutters 25, 27 are not formed.

While in the present embodiment, a space remains between the tail gate 5 in the closed position as illustrated in FIG. 3 and the left or right track 201, 301, this should not be construed in a limiting sense. Another possible embodiment is that a sealing member is provided in the space.

I claim:

1. A sealing structure for a truck cargo bed with a shutter, the sealing structure comprising:
- a cargo bed for a truck;
- the shutter, the shutter coupling to an upper part of the cargo bed by a left track and a right track, the shutter extending in parallel with the cargo bed, and the shutter being movable between at least two positions in a front-rear direction of an automobile body to open and close an opening at the upper part of the cargo bed,
- a left side wall vertically mounted on a left end of the cargo bed;
- a right side wall vertically mounted on a right end of the cargo bed;
- the left track, which is mounted on a top edge of the left side wall;
- the right track, which is mounted on a top edge of the right side wall;
- a tailgate mounted on a rear end of the cargo bed, the tailgate being pivotal in the front-rear direction of the automobile body with a lower end part of the tailgate as a pivotal axis, and the tailgate and the left and right side walls surrounding the cargo bed when the tailgate is in a closed position;
- a bed liner seal member provided on rear ends of the left and right side walls;
- a touch member provided on a left side end and a right side end of a rear part of the shutter, the touch member being configured to make elastic contact with the bed liner seal member when the shutter is fully extended, and the touch member being configured to touch first and second seal beads on an upper surface from an upper side;
- a shutter seal member provided on a rear end of the shutter, the shutter seal member being configured to make elastic contact with the tailgate when the tailgate is in the closed position;
- a protrusion which forms a part of the bed liner seal member; and
- the first and second seal beads, the first and second seal beads being provided on an upper wall of the protrusion, and the first and second seal beads extending in a right-left direction of the automobile body.

2. The sealing structure as claimed in claim 1, further comprising a tailgate seal member provided on an upper part of a front surface of the tailgate, the tailgate seal member being configured to make elastic contact with the bed liner seal member when the tailgate is in the closed position.

3. The sealing structure as claimed in claim 1, further comprising third and fourth seal beads on a side surface, the third and fourth seal beads being provided on a side wall of the protrusion of the bed liner seal member, the third and fourth seal beads extending in an upper-lower direction of the automobile body, the side wall being adjacent to an inner side of the cargo bed, and the touch member being configured to touch the third and fourth seal beads from a lateral side.

4. The sealing structure as claimed in claim 3, wherein the first and second seal beads on the upper surface are continuous with the third and fourth seal beads on the side surface, the first and second seal beads are parallel with each other and provided on the upper wall of the protrusion of the bed liner seal member, and the third and fourth seal beads are parallel with each other and provided on the side wall of the protrusion of the bed liner seal member.

5. The sealing structure as claimed in claim 3, further comprising:
- a first gutter provided beneath the protrusion of the bed liner seal member, the first gutter being closer to a front part of the automobile body than the protrusion, and the first gutter extending in the right-left direction of the automobile body; and
- a second gutter provided beneath the third and fourth seal beads on the side surface, the second gutter being closer to an interior of an automobile than the side wall of the protrusion of the bed liner seal member, the second gutter extending in the front-rear direction of the automobile body, and the second gutter being continuous with the first gutter.

6. The sealing structure as claimed in claim 5, further comprising a hole provided closer to a rear part of the automobile body than the second gutter, the hole being configured to drain water guided into the first and second gutters toward an exterior of the automobile.

7. The sealing structure as claimed in claim 5, wherein:

the touch member includes:

an upper wall;

a side wall which extends downward from a part of the upper wall closest to the interior of the automobile and in the front-rear direction of the automobile body; and an inner wall which extends downward from a part of the upper wall closest to the front part of the automobile body and in the right and left direction of the automobile body, and when the shutter is fully extended, a lower surface of the upper wall of the touch member touches the first and second seal beads on the upper surface, an outer side surface of the side wall touches the third and fourth seal beads on the side surface, a lower surface of the inner wall makes elastic contact with a first wall which forms a part of the first gutter, and a lower surface of the side wall makes elastic contact with a second wall which forms a part of the second gutter.

8. The sealing structure as claimed in claim 7, wherein a lower end of the inner wall of the touch member is folded toward the front part of the automobile body such that the inner wall has an L-shaped cross section.

* * * * *